(12) United States Patent
Laverdiere

(10) Patent No.: US 10,773,901 B2
(45) Date of Patent: Sep. 15, 2020

(54) ROTARY PICKER WITH ARMS

(71) Applicant: James Laverdiere, Boxford, MA (US)

(72) Inventor: James Laverdiere, Boxford, MA (US)

(*) Notice: Subject to any disclaimer, the term of this patent is extended or adjusted under 35 U.S.C. 154(b) by 33 days.

(21) Appl. No.: 16/166,683

(22) Filed: Oct. 22, 2018

(65) Prior Publication Data

US 2019/0071260 A1 Mar. 7, 2019

Related U.S. Application Data

(63) Continuation-in-part of application No. 14/944,807, filed on Nov. 18, 2015, now Pat. No. 10,106,335.

(60) Provisional application No. 62/081,523, filed on Nov. 18, 2014, provisional application No. 62/692,163, filed on Jun. 29, 2018.

(51) Int. Cl.
*B65G 47/84* (2006.01)
*B65G 47/86* (2006.01)
*B65G 47/90* (2006.01)

(52) U.S. Cl.
CPC ......... *B65G 47/848* (2013.01); *B65G 47/842* (2013.01); *B65G 47/847* (2013.01); *B65G 47/902* (2013.01)

(58) Field of Classification Search
CPC ............ B29C 2043/3472; B65G 29/00; B65G 47/84; B65G 47/842; B65G 47/846; B65G 47/847; B65G 47/848; B65G 47/86; B65G 47/902; B65H 2301/44714
USPC .......................... 198/377.03, 441, 450, 459.2
See application file for complete search history.

(56) References Cited

U.S. PATENT DOCUMENTS

| | | | |
|---|---|---|---|
| 8,006,825 B2 | 8/2011 | Lenherr | |
| 2002/0039183 A1* | 4/2002 | Yagita | G01N 21/9027 356/240.1 |
| 2002/0150647 A1 | 10/2002 | Cloutier | |
| 2009/0025337 A1* | 1/2009 | Skarin | B65B 61/186 53/133.1 |
| 2010/0096241 A1 | 4/2010 | Lenherr | |
| 2016/0214306 A1 | 7/2016 | Linke | |
| 2017/0137233 A1 | 5/2017 | Mart | |

\* cited by examiner

*Primary Examiner* — Saul Rodriguez
*Assistant Examiner* — Brendan P Tighe
(74) *Attorney, Agent, or Firm* — Danielson Legal LLC

(57) ABSTRACT

Methods and apparatus for picking items. Item picking devices are operably positioned on a rotatable frame portion so that they move in a rotary motion to pick items from a conveyor belt or other area as required. By moving item picking devices in a rotary motion in proximity to a conveyor belt or other area, embodiments of the present invention can more efficiently pick and place items for packaging, processing, shipment, or for further use and without being limited by space constraints.

20 Claims, 15 Drawing Sheets

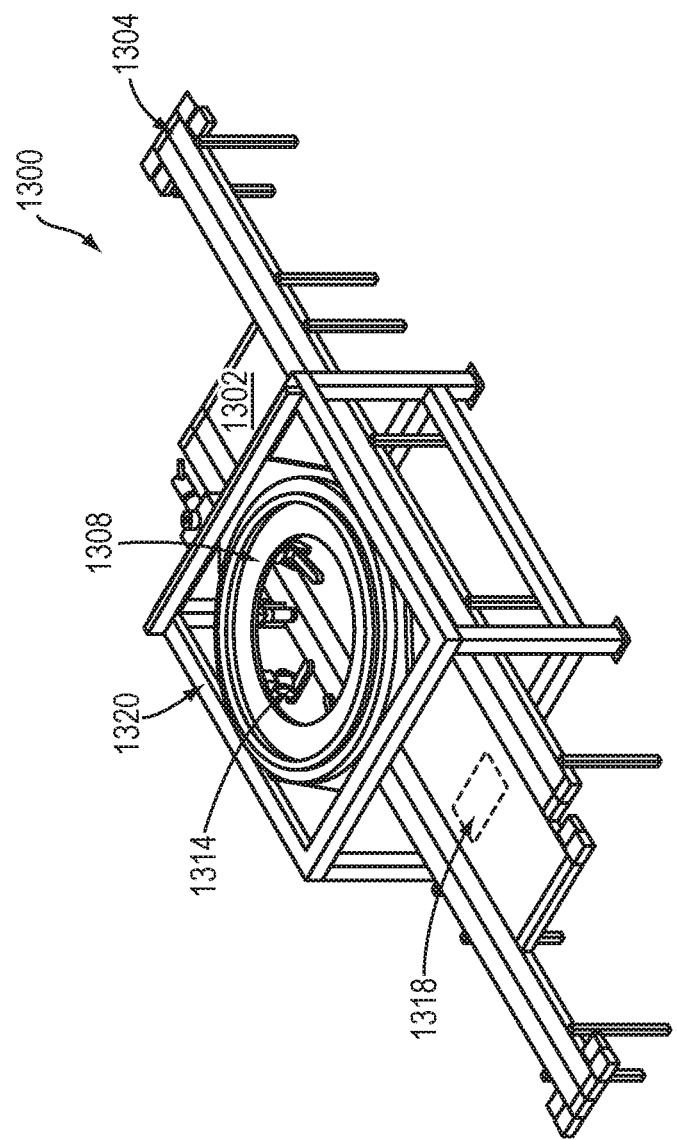

ROTARY PICKER WITH ARMS

CROSS-REFERENCE TO RELATED APPLICATIONS

This application claims priority to and the benefit of U.S. Provisional Patent Application No. 62/692,163, filed on Jun. 29, 2018, and U.S. patent application Ser. No. 14/944,807, filed on Nov. 18, 2015, which in turn claims priority to U.S. Provisional Patent Application No. 62/081,523, filed on Nov. 18, 2014, each of which are hereby incorporated herein by reference in their entirety.

TECHNICAL FIELD

This invention generally relates to methods and apparatus for picking items and, more particularly, to a picker with at least one item picking device that rotates about the center of the picker to be in position to pick at least one item.

BACKGROUND

Manufacturing processes or the like often require goods to be moved from a first area and placed in a different area for processing or for use. In the past, these "pick and place" tasks were performed by humans positioned near a conveyor belt, for example. When a certain item was sighted on the conveyor belt, the person would manually reach for the item on the belt, remove the item from the belt, and place the item in another location. This location may be another conveyor belt, a box, or another location so the item can be stored or put to further use.

This manual "pick and place" technique has its disadvantages, as the work can be tedious and stressful for a human worker. Additionally, this process is often dangerous as the human workers are near heavy, active machinery.

In an attempt to overcome these disadvantages, "pick and place" processes were automated some time ago. Common automated techniques involve multiple robotic manipulators (arms) with multiple degrees of freedom positioned near a conveyor belt or other locations in which items need to be gathered. These manipulators often include an end effector device to grab the items, such as a claw or other hand-like device.

These automated robotic manipulators also have disadvantages. For example, scaling such an installation may require a significant amount of space along a conveyor belt and may be limited by the length of the belt. Additionally, these robotic manipulators typically require several joints to enable multiple degrees of motion, and these joints may be difficult to clean and maintain. Spider arm configurations, for example, often break under load and can be difficult to clean. This inevitably leads to corrosion and contamination, thus requiring maintenance and replacement.

A need exists, therefore, for a picking apparatus and method that overcomes the above-mentioned deficiencies.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect, embodiments relate to an item picking apparatus comprising a rotatable frame portion with a center and a plurality of picking devices that are each operably connected to the rotatable frame portion so that the picking devices rotate about the center of the frame portion to be in position to pick items that are adjacent to the rotatable frame portion, wherein at least one of the plurality of picking devices is a multi-axis robotic arm.

In some embodiments, the apparatus comprises a rotatable frame portion having a central axis of rotation and an exterior rim and a plurality of picking devices that are each operably connected to the rotatable frame portion, wherein at least one picking device is a multi-axis robotic arm, the multi-axis robotic arm having a first link and a second link, the first link and second link of the multi-axis robotic arm are connected at a first joint, such that the second link is configured to move, independently of the first link, around the first joint between the central axis of rotation and the exterior rim to be in a position to pick up at least one item adjacent to the rotatable frame portion.

In some embodiments of the apparatus, the apparatus further comprises a plurality of spoke portions, each portion having a first end connected to the center of the rotatable frame portion, wherein the plurality of picking devices are operably connected to the spoke portions. In some embodiments of the apparatus, the apparatus further comprises at least one movement mechanism operably connected to at least one of the plurality of picking devices so that the at least one connected picking device can move linearly along the spoke portions. In some embodiments of the apparatus, the at least one movement mechanism is one or more of a belt, chain, hydraulic mechanism, or a servo motor.

In some embodiments of the apparatus, each spoke portion has a second end opposite the center of the frame, further comprising an exterior rim that connects at least two of the plurality of spoke portions at their second ends.

In some embodiments of the apparatus, the picking devices are implemented as one or more of a vacuum device, a magnetic device, a claw device, a manual gripping device, or a suction device.

In some embodiments of the apparatus, the apparatus further comprises at least one sensing mechanism to gather information regarding the location of at least one item to be picked. In some embodiments of the apparatus, the at least one sensing mechanism is one or more of charged-coupled camera devices, LIDAR, or weight sensing devices.

In some embodiments of the apparatus, the rotatable frame portion is operably positioned with respect to a conveyor belt to enable the picking devices to pick items from the conveyor belt.

In some embodiments of the apparatus, the apparatus further comprises a rotating mechanism to rotate the rotatable frame portion, wherein the rotating mechanism is one or more of a continuous motor, a stepper motor, or a motor that applies a torque force to the rotatable frame portion.

In some embodiments, the multi-axis robotic arm has six degrees of freedom. In some embodiments, the multi-axis robotic arm further comprises a third link connected to the first link of the multi-axis robotic arm at a second joint. In some embodiments, each picking device is a multi-axis robotic arm. In some embodiments, the first link of the multi-axis robotic arm is coupled to the rotatable frame portion.

In some embodiments of the apparatus, the apparatus further comprises a control unit configured to receive information related to the items to be picked and further configured to control movement of the picking devices so that the picking devices can pick the items.

In another aspect, embodiments of the invention relate to a method of picking at least one item. The method comprises obtaining information from a sensing mechanism regarding a first location of the item, moving the at least one item in a rotary motion using at least one picking device, wherein the at least one picking device is operably connected to a rotatable frame portion with a center, and wherein the at least one picking device is a multi-axis robotic arm, and placing the at least one item, using the picking device, in a second location.

In some embodiments of the method, the multi-axis robotic arm has a first and second link, the first and second link of the multi-axis robotic arm are connected at a first joint, such that the second link is configured to move, independently of the first link, around the first joint between the central axis of rotation and the exterior rim to be in a position to pick up at least one item adjacent to the rotatable frame portion In some embodiments of the method, the multi-axis robotic arm has six degrees of freedom.

In some embodiments of the method, the method further comprises moving the picking device in a linear motion towards the at least one item. In some embodiments of the method, the at least one picking device is moved by one or more of a belt, chain, hydraulic mechanism, or a server motor.

In some embodiments of the method, the first location is a conveyor belt.

In some embodiments of the method, the second location is a return belt.

In some embodiments of the method, the at least one picking device is implemented as one or more of a vacuum device, a magnetic device, a claw device, a manual gripping device, or a suction device.

In some embodiments of the method, the rotary motion is provided by one or more of a continuous motor, a stepper motor, or a motor that applies a torque force to the rotatable frame portion.

In some embodiments of the method, the rotatable frame portion includes a plurality of spoke portions that extend from the center of the rotatable frame portion and each of the at least one picking device is operably connected to a spoke portion.

In yet another aspect, embodiments of the present invention relate to an item picking apparatus comprising a first conveyor belt for transporting items in a first direction; a second conveyor belt for transporting items in a second direction; and a rotary picker operably positioned with respect to the first and second conveyor belts, wherein the rotary picker includes: a rotatable frame portion with a center, a plurality of spoke portions, each spoke portion having a first end and a second end, wherein the first end is connected to the center of the rotatable frame portion and each spoke portion radially extends from the center of the rotatable frame portion, an exterior rim that connects at least two of the plurality of spoke portions at their second ends, and a plurality of picking devices that are each operably connected to a spoke portion so that the picking devices rotate about the center of the rotatable frame portion to be in position to pick items from the first conveyor belt and to place them on the second conveyor belt, wherein at least one of the plurality of picking devices is a multi-axis robotic arm.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

The invention and embodiments thereof will be better understood when the following detailed description is read in conjunction with the accompanying drawing figures:

FIG. 13B illustrates a perspective view of the rotary picking apparatus of FIG. 13A;

In the drawings, like reference characters generally refer to corresponding parts throughout the different views. Elements are not necessarily drawn to scale, emphasis instead being placed on the principles and concepts of operation.

DETAILED DESCRIPTION

Figure 1:
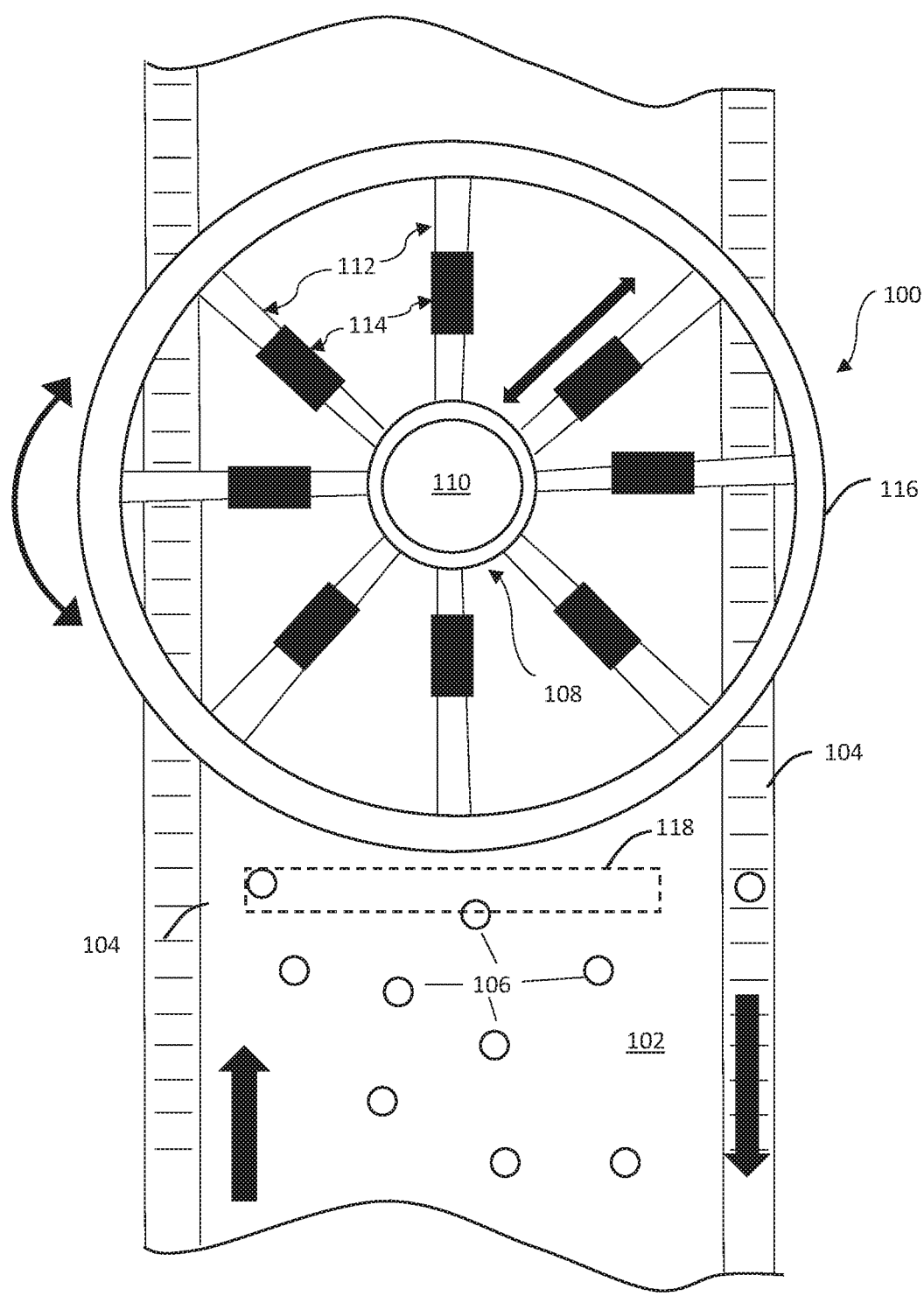
FIG. 1 illustrates an overhead view of a rotary picking apparatus in accordance with one embodiment of the invention.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

FIG. 1 illustrates an overhead view of a rotary picker 100 in accordance with one embodiment of the invention. Embodiments of the invention may be deployed in any type of facility: storage, shipping, packaging, processing, manufacturing, or the like. Food and beverage items, for example, often are moved throughout a facility and need to be picked, packaged, and shipped to their destination.

Quality assurance programs may also benefit from the features of the invention. Oftentimes items of sub-par quality may need to be removed for quality control or safety reasons. The rotary picker may therefore pick and remove certain, unacceptable items from a conveyor belt or the like.

Once items are picked, they may be placed in a variety of other locations for specific purposes. For example, picked items may be placed on a different moving belt to be transported to some other location for disposal, packaging, or further use. Or, items may simply be stored in bins or boxes nearby. Items (e.g., food items) may be stacked atop of one another as well before packaging.

Referring back to FIG. 1, the rotary picker 100 is illustrated above a conveyor belt 102 and return belt(s) 104 that transport items 106. The rotary picker 100 picks items 106 from the conveyor belt 102, and then places them in a return belt 104 which transports to picked items to another location for further processing, storage, or use.

In this embodiment, the rotary picker 100 includes a rotatable frame portion 108 with a center portion 110 and a plurality of spoke portions 112 that extend from the center portion 110. In this embodiment there are a plurality of item picking devices 114 (in this embodiment, one item picking device 114 per spoke portion 112, although other configurations with multiple devices 114 per spoke are possible), an exterior rim 116 connecting ends of the spoke portions 112, and a sensing mechanism 118 to gather information regarding the items 106. Although eight (8) item picking devices 114 are illustrated, the number of item picking devices 114 used may of course vary and depend on the size of the rotary picker 100 and the number of spoke portions 112.

The rotatable frame portion 108 may be of any type of configuration as long as it can rotate such that the item picking devices 114 move in a rotary fashion. The rotatable frame portion 108 may be moved (i.e., rotated) by a rotating mechanism. This rotating mechanism may be one or more of a stepper motor, a continuous motor, or a motor that provides a torque force to the frame, etc.

In alternate embodiments, for example, the item picking devices 114 may be placed on variable-sized rings in a concentric configuration. In this embodiment the rings may rotate to move the item picking devices in a rotary motion and/or the item picking devices 114 may move around the rings while the rings themselves remain fixed.

Figure 2:
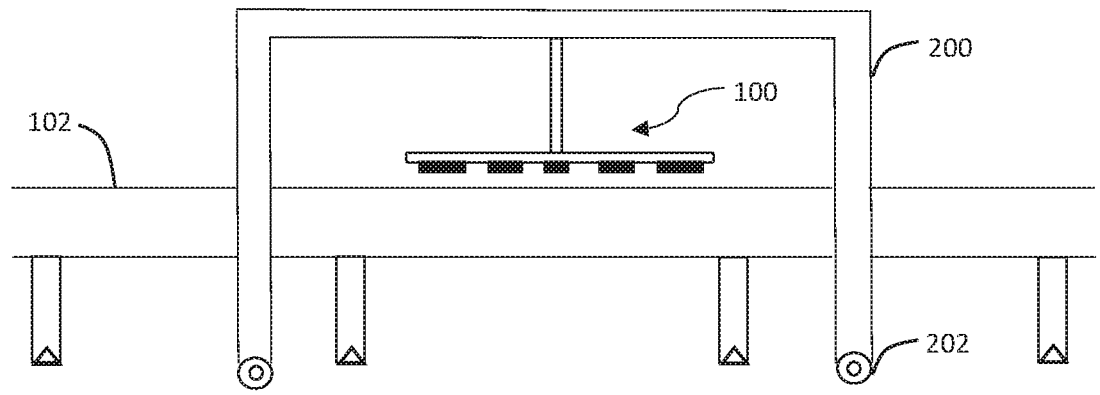
FIG. 2 illustrates a side view of a rotary picking apparatus in accordance with one embodiment of the invention.

FIG. 2 presents a side view of the rotary picker 100 of FIG. 1 positioned over the conveyor belt 102. In this embodiment, the rotary picker 100 is supported by a support frame 200 that positions the rotary picker in proximity to the conveyor belt 102 (the support frame 200 is not illustrated in FIG. 1). In this embodiment, the support frame 200 may include four (4) legs, two positioned on each side of the conveyor belt 102.

The support frame 200 may also include a set of wheels 202 (which may include a locking mechanism) so the rotary picker 100 can be moved to different positions along the conveyor belt 102. Alternatively, the support frame 200 may be fixed to the ground.

FIG. 2 is merely one embodiment of how the rotary picker 100 can be supported and positioned with respect to the conveyor belt 102. In other embodiments, for example, the support frame 200 may be attached to the ceiling.

Figure 3:
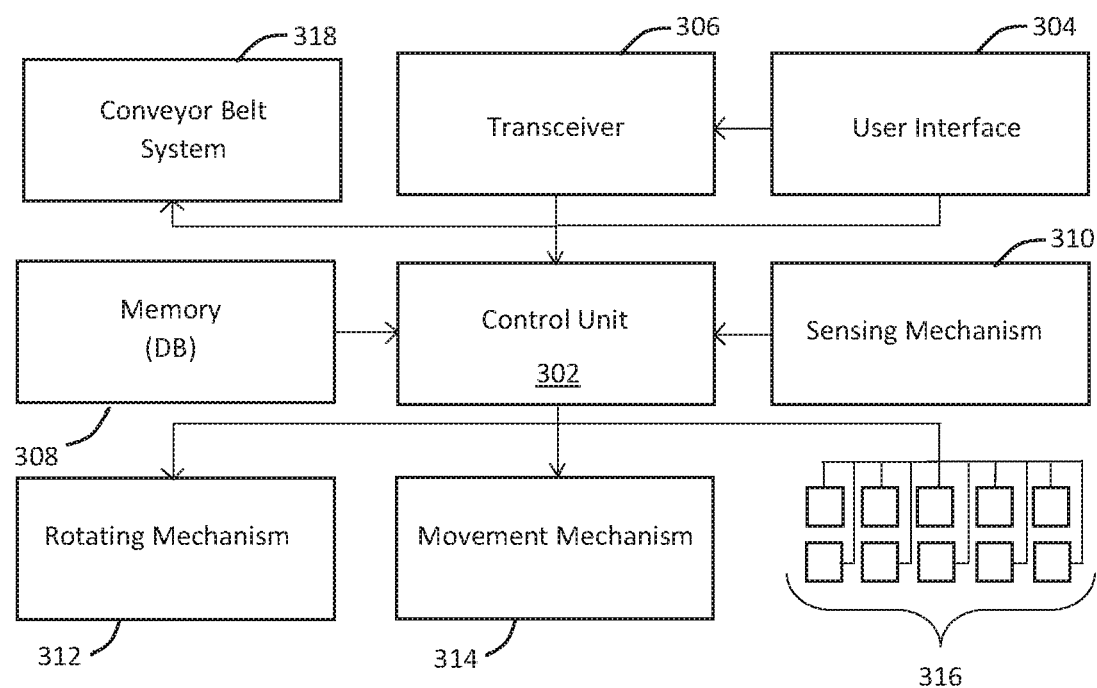
FIG. 3 schematically illustrates a rotary picking apparatus in accordance with one embodiment of the invention.

FIG. 3 schematically illustrates components of the rotary picker 100 in accordance with one embodiment of the invention. FIG. 3 illustrates a control unit 302, a user interface 304, a transceiver 306, memory 308, a sensing mechanism 310, a rotating mechanism 312, a movement mechanism 314, and a plurality of item picking devices 316.

The control unit 302 is in operable communication with many of the components of the rotary picker 100. The control unit 302 is configured to receive information at least related to items to be picked and configured to instruct the rotating mechanism 312, the movement mechanism(s) 314, and the item picking devices 316 accordingly.

The control unit 302 may be implemented as any specially configured processor as long as it is able to receive and process information related to the items. This information may relate to the size, weight, and movement of the items as determined by the sensing mechanism 310. The control unit 302 may then communicate electrical control signals to the appropriate devices 312, 314, and/or 316.

The control unit 302 may also receive inputs and commands from operators via the user interface 304. An operator may input, for example, the number and type of a particular item that needs to be picked by the rotary picker 100. To input these commands, the user interface 304 may be implemented as a touch screen display and/or include a keyboard and mouse.

The user interface 304 may be connected to the control unit 302 via a hardwired connection, for example. Or, the user interface 304 may communicate with the control unit 302 via a wireless connection using the transceiver 306.

The user interface 304 may be implemented as any type of existing module within the environment that houses the rotary picker 100 or any other type of display. The user interface 304 may be implemented as a smartphone, tablet, PC monitor, laptop monitor, or the like. Operators can therefore receive information regarding the operation of the rotary picker 100 (e.g., if there is a breakdown) and to enter commands regarding picking assignments for the rotary picker 100.

The control unit 302 may be in operable communication with memory 308. The memory used in accordance with the features of various embodiments of the invention may include non-volatile memory such as flash memory, EPROM, EEPROM, ROM, and PROM, or volatile memory such as static or dynamic RAM, as discussed above. The exact configuration/type of memory 308 used may of course vary as long as information can be stored and retrieved to accomplish the features of various embodiments of the invention.

The memory 308 may store information related to rotary picking assignments. For example, the memory 308 may store information relating to scheduling of the rotary picker 100 so that the rotary picker 100 picks a certain number items at a particular time of each day. As another example, if the item picking device 316 is implemented as a claw-device, the memory 308 may store information relating to how "wide" the claw must open to pick a particular item. If the item picking devices 316 are implemented as suction devices, the memory 308 may store information relating to how much suction force is required to pick a particular item. This increases picking efficiency while reducing power consumption.

The sensing mechanism 310 may be in operable communication with the control unit 302 to gather and provide information regarding the items to be picked. This information may be related to the locations and movement of the items if they are on a conveyor belt 102, for example.

For example, assume the items are moving along a conveyor belt such as the conveyor belt 102 of FIG. 1. The sensing mechanism 310 may gather information about where a particular item is located on the conveyor belt 102, as well as the speed of the item (i.e., the speed of the belt). This information may be communicated to the control unit 302, which may then provide commands to the appropriate devices 312, 314, and 316 to pick the items.

The sensing mechanism(s) 310 may be, for example, camera device(s) used to gather information about the items, their locations, and their movements. The sensing mechanism(s) 310 may be stereoscopic cameras, 3D camera(s), infrared camera(s), LIDAR, high-resolution camera(s), or the like. Imagery gathered by the sensing mechanism 310 may be processed by, say, computer vision analysis techniques to learn more about the items' movement. Alternatively, the sensing mechanism 310 may itself analyze the raw measurements and provide data indicative of an item, its location, and its movement for further processing.

The color of the conveyor belt 102 and the items 106 may be chosen such that they have high contrast with each other in the visual or near-visual spectrum. This facilitates the item identification process.

The sensing mechanism 310 may also be implemented as a weight sensing scale. In this embodiment, the sensing mechanism 310 may be positioned below the conveyor belt 102 and can sense an item as it moves over the sensing mechanism 310 by its weight or its proximity using, e.g., capacitive manners. Similarly, the scale may also determine what type of items are on the conveyor belt based on their weight.

In another embodiment, the sensing mechanism 310 may be configured as a laser device. A laser projector and receiver may be positioned at opposite sides of the conveyor belt 102 to detect items as they move between the projector and receiver.

In yet another embodiment, the sensing mechanism 310 may be configured as a pressure sensitive or weight measuring surface that localizes the location of an object through the weight measured on its surface.

The rotating mechanism 312 may be operably configured as part of the rotatable frame portion 108 of the rotary picker 100. The rotating mechanism 312 rotates the rotatable frame clockwise and/or counter-clockwise such that the item picking devices 316 are in position to pick desired items. In certain embodiments, the rotating mechanism 312 may be implemented as a continuous motor, a stepper motor, a motor that applies a torque force to the exterior portions of the rotatable frame, etc.

The rotating mechanism 312 may receive electrical command signals from the control unit 302 to rotate as required. Additionally, it is also contemplated that an operator may control the rotatable frame's movement.

The movement mechanism(s) 314 may be positioned on portions of the rotatable frame portion and operably connected to the item picking devices 316. Although the item picking devices 316 may be fixed onto portions of the rotatable frame portion, in certain embodiments they may move to provide an additional layer of accuracy and ability in picking items.

For example, in the embodiment illustrated in FIG. 1, the item picking devices 114 may move linearly along the spoke portions 112 (as indicated by the bidirectional arrows). In this embodiment, therefore, the item picking devices 114 can move in a rotary motion by the rotating mechanism 212 (not shown in FIG. 1), and linearly by the movement mechanisms 214 (not shown in FIG. 2).

The item picking devices 316 may also move independently of each other. That is, the item picking devices 316 may each be controlled by their own movement mechanism 314 that can be selectively activated and deactivated by the control unit 302. Therefore, a first item picking device 316' may linearly move towards the center of the rotatable frame portion while a second item picking device 316" may linearly move away from the center.

The control unit 302 may also be in communication with the conveyor belt system 318. For example, the control unit 302 may change the speed of the conveyor belt 102 to make picking items easier or to increase the quantity of picked items, for example. Information regarding the speed of the conveyor belt 102 may be communicated to the control unit 302 from the conveyor belt system 318 and/or determined by the sensing mechanism 310.

The source of power for the rotating mechanism 312, the movement mechanism 314, and the item picking devices 316 may be located in the center portion 110, for example. Or, the source of power for these devices may be located in the exterior rim 116 or another location external to the rotary picker 100. Regarding the item picking devices 316, a power source my drive a single item picking device 316 or multiple item picking devices 316.

Figure 4:
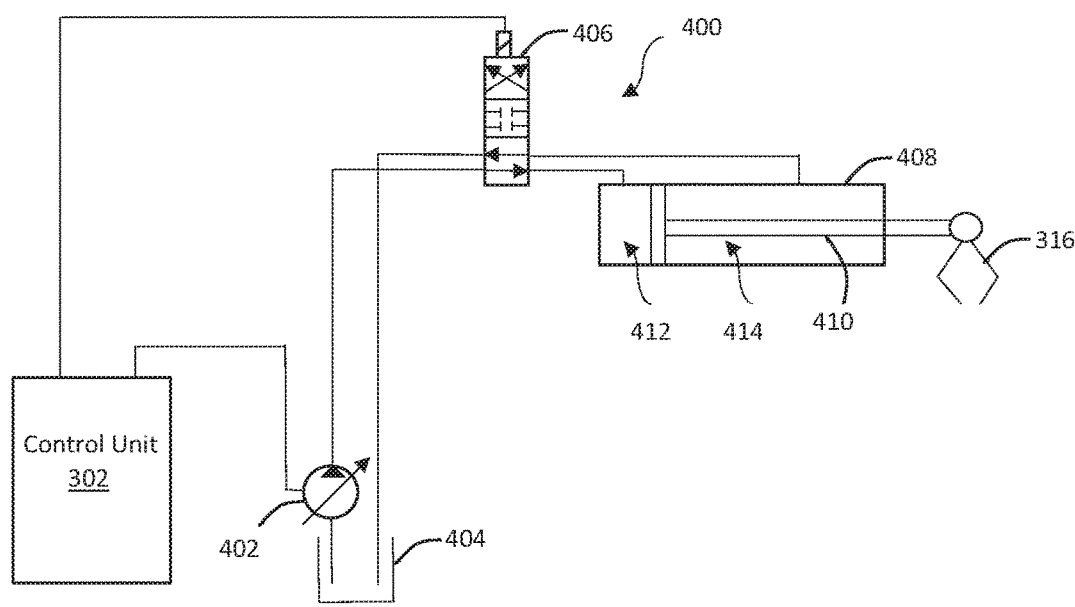
FIG. 4 illustrates the movement mechanism of FIG. 3 in accordance with one embodiment of the invention.

The movement mechanism(s) 314 may be implemented in a variety of ways. In one embodiment, one or more of the movement mechanisms 314 may be configured as a hydraulic/pneumatic actuator or the like. FIG. 4 illustrates a hydraulic system 400 operably connected with an item picking device 316 (illustrated as a claw device). The hydraulic system 400 may include a variable displacement pump 402 in operable communication with the control unit 302, a fluid reservoir 404, an electrically activated solenoid three-position valve 406, and an actuator 408 connected to the item picking device 316.

In this embodiment, the actuator 408 may be operably attached to a spoke portion 112 so the item picking device 316 can move linearly along the spoke portion 112. According to this embodiment, each item picking device 316 is moved by its own actuator 408.

In use, the control unit 302 may signal the pump 402 to pump fluid at a certain rate. The fluid may be transported by a system of tubes or the like. The control unit 302 may also be in communication with the electronically activated valve 406 to control the valve's position. By controlling the valve's position, fluid can be channeled to either end of the actuator 408, which includes a piston 410 that divides the actuator 408 into a first end 412 and a second end 414.

For example, when fluid is directed into the first end 412, the piston 410 and the item picking device 316 move outward. Fluid that was previously in the second end 414 of the actuator 408 is directed through the valve 406 and back towards the fluid reservoir 404. When fluid is directed into the second end 414 of the actuator 408, the piston 410 and the item picking device 316 move inward. Fluid that was previously in the first end 412 of the actuator 408 is directed back into the fluid reservoir 404.

The valve 406 can also be in a closed position. No fluid is transported in this position and the actuator 408 does not provide movement to the item picking device 416.

FIG. 4 is merely an exemplary movement mechanism implementing a hydraulic system 400. Additional and other types of hydraulic components may be used as well. For example, other types of valves may be used in lieu of the three-position solenoid valve 406 as long as fluid can be appropriately directed to and from the actuator 408. Although a hydraulic system is illustrated, a pneumatic system can similarly be used as well.

Figure 5:
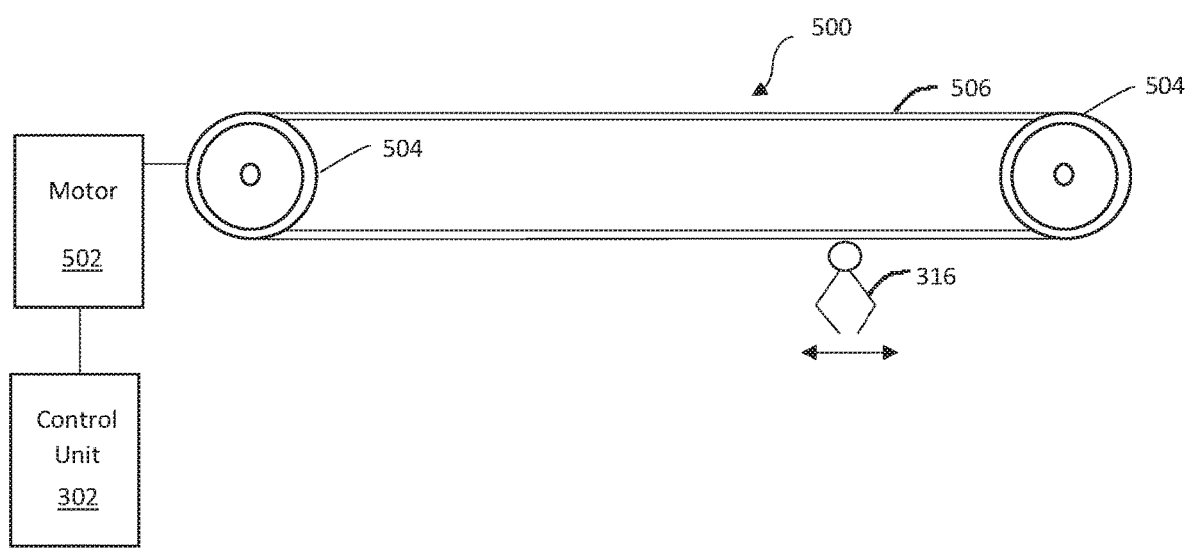
FIG. 5 illustrates the movement mechanism of FIG. 3 in accordance with another embodiment of the invention.

FIG. 5 illustrates the movement mechanism in accordance with another embodiment of the invention. In this embodiment, the moving mechanism is implemented as a belt system 500. The belt system 500 may include a belt motor 502, wheels 504, belt 506, and an item picking device 316 (again illustrated as a claw-device).

In use, the control unit 302 may communicate an electrical control signal to the belt motor 502 to rotate the wheels 504 (in either a clockwise or counter-clockwise direction). The rotation of the wheels 504 therefore causes the belt 506 to move clockwise or counter-clockwise. As the belt 506 moves, the item picking device 316 may similarly move to the left or to the right (as illustrated by the double arrows).

The belt system 500 (i.e., the wheels 504 and the belt 506) may be positioned along a spoke portion 112, for example. The item picking device 316 may be moved linearly along the spoke portion 112 therefore to be in location to pick items as desired.

FIG. 5 is merely an exemplary movement mechanism implemented as belt system. Additional and other types of components may be used in this configuration. For example, more than two wheels 504 may be used to assist in moving the belt 506.

Figure 6:
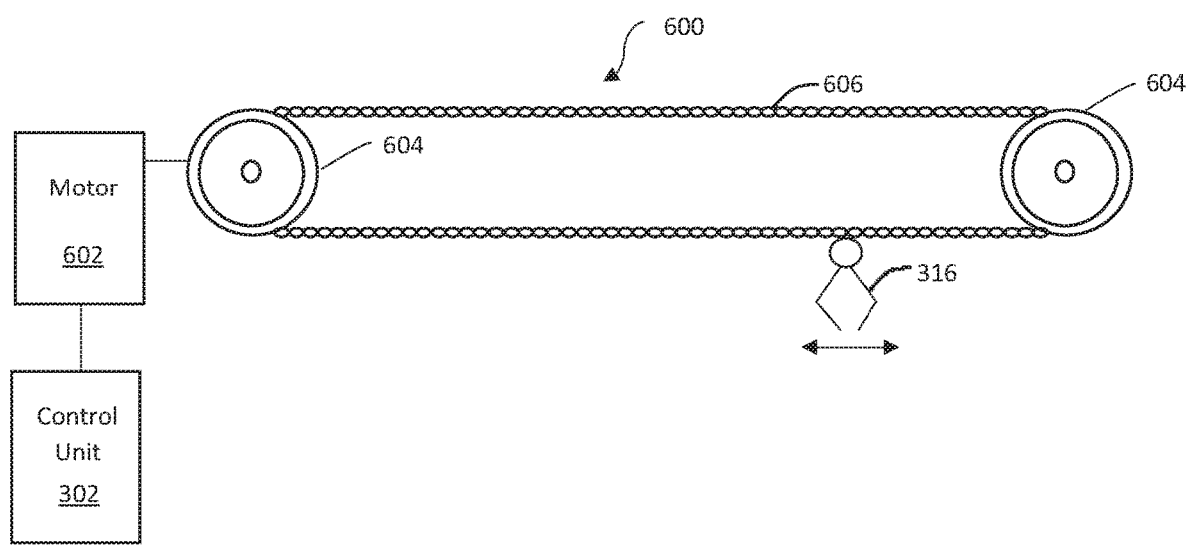
FIG. 6 illustrates the movement mechanism of FIG. 3 in accordance with yet another embodiment of the invention.

FIG. 6 illustrates the movement mechanism in accordance with another embodiment of the invention. In this embodiment, the moving mechanism is implemented as a chain system 600. The chain system 600 is similar to the belt system 500 of FIG. 5, and may include a chain motor 602, wheels 604, a chain 606, and an item picking device 316 (again illustrated as a claw-device).

In use, the control unit 302 may communicate an electrical control signal to the chain motor 602 to rotate the wheels 604 (in either a clockwise or counter-clockwise direction). The rotation of the wheels 604 causes the chain 606 to move clockwise or counter-clockwise. As the chain 606 moves, the item picking device 316 may similarly move to the left or to the right (as illustrated by the double arrows).

FIG. 6 is merely an exemplary movement mechanism implemented as a chain system 600. Additional and other types of components may be used in this configuration. For example, the wheels 604 may include sprockets to assist in "grabbing" and moving the chain 606.

Figure 7:
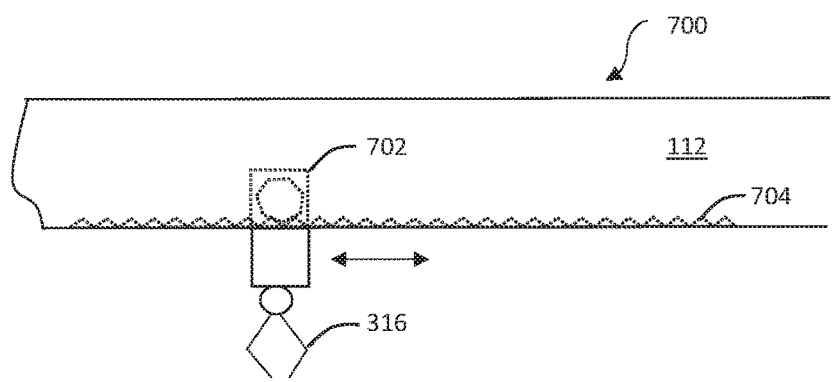
FIG. 7 illustrates the movement mechanism of FIG. 3 in accordance with yet another embodiment of the invention.

FIG. 7 illustrates another embodiment of the moving mechanism, in which the moving mechanism is a self-actuating system 700. The self-actuating system 700 may include a servo motor device 702, a row of teeth 704 configured as part of a spoke portion 112, and the item picking device 316 (again illustrated as a claw-device).

In use, the servo motor (which may be connected to the control unit 302, not shown) may move along the teeth 704 in a linear direction to the spoke portion 112. As the servo motor device 702 moves, the item picking device 316 may similarly move to the left or to the right (as illustrated by the double arrows). It is noted that embodiments may include both self-actuating movement mechanisms (e.g., the servo motor device 702 and exterior movement mechanisms such as the hydraulic system 400 or the belt system 500).

Figure 8:
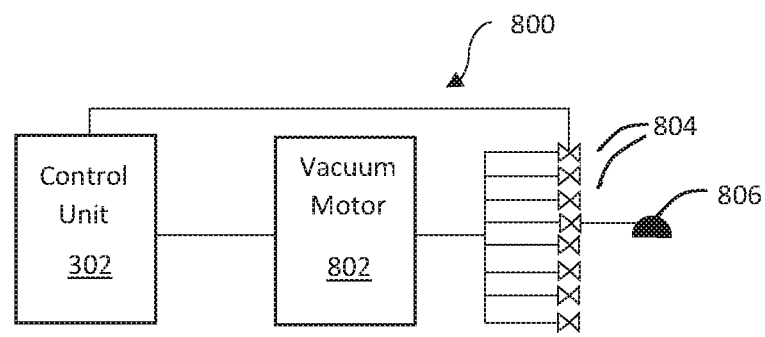
FIG. 8 illustrates the item picking device of FIG. 3 in accordance with one embodiment of the invention.

As stated previously, there may be many different configurations for the item picking devices 316. The type of item picking device used may also depend on the type of items to be picked. FIG. 8, for example, illustrates the item picking device implemented as a vacuum system 800.

The vacuum system 800 includes a vacuum motor 802 in operable communication with the control unit 302, a plurality of valves 804, and a plurality of item picking devices implemented as vacuum cups 806. In use, the control unit 302 may activate the vacuum motor 802 to create a vacuum force. The control unit 302 may also open/close select valves 804 (each valve 804 may allow flow to an individual vacuum cup 806. When a valve is open a vacuum force is created such that the vacuum cup 806 can "pick" an item. The vacuum cup 806 may also be lowered by some other mechanical means to be closer to the item to be picked.

Figure 9:
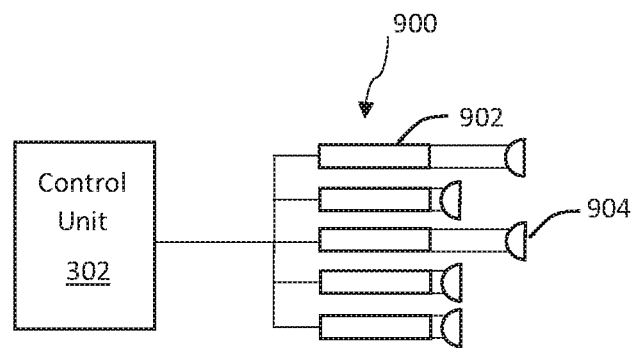
FIG. 9 illustrates the item picking device of FIG. 3 in accordance with another embodiment of the invention.

FIG. 9 illustrates an embodiment of the item picking device implemented as a suction system 900. In this embodiment, the suction system 900 may include a plurality of extension members 902 connected to the control unit 302, where each extension member 902 is connected to at least one suction device 904.

The suction system 900 may use, but does not require, a vacuum motor such as the one illustrated in FIG. 8. Rather, the control unit 302 may merely send control signals to a specific extension member 902 to longitudinally extend the extension member 902. This moves the suction device 904 to contact and create a suction force with the item.

The extension member 902 may be any type of member that can move the suction device 904 to contact the item. The extension member 902 may be configured as a hydraulic or pneumatic actuator, for example. Or the extension member 902 may be a telescoping member.

FIG. 9 is merely an exemplary item picking device implemented as a suction device. Additional and other types of components may be used in this configuration. For example, there may be a plurality of suction devices 904 connected to an extension member 902, rather than only one as illustrated in FIG. 9. Similarly, more than one extension member 902 may be connected to a single suction device 904.

The suction device(s) 904 may be of any type of material that can create a suction force. For example, the suction device(s) 904 may be formed of a urethane (rubber) material. Preferably, suction devices are used only when picking items that have substantially flat surfaces so that the suction devices can create a suction force. The suction devices 904 may also be configured with a release that can be activated by the control unit 302 to "drop" or otherwise release the item from the suction device 904.

Figure 10:
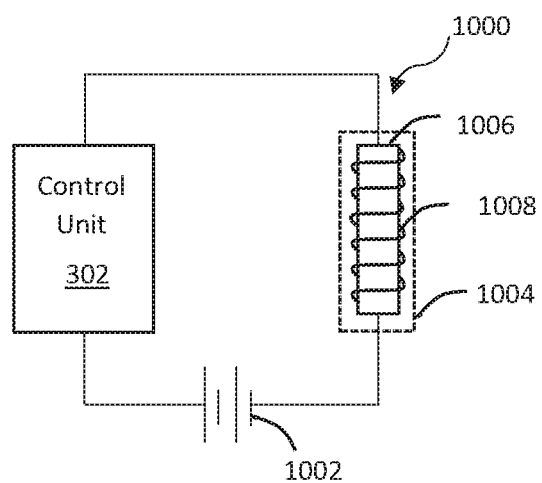
FIG. 10 illustrates the item picking device of FIG. 3 in accordance with yet another embodiment of the invention.

FIG. 10 illustrates an embodiment of the item picking device implemented as a magnetic system 1000. This embodiment of the item picking device includes a battery 1002 in operable connection with the control unit 302, and a battery 1002 comprising a core 1006 such as iron or the like, and a coil 1008 wrapped around the core 1006.

In use, the control unit 302 may communicate a signal to activate the battery 1002. The battery 1002 then sends a current through the coil 1008 to produce a magnetic field around the core 1006. The strength of the magnetic field can be controlled by the amount of current flowing through the coil 1008. The magnetic field may then attract any item to the magnet 1004 (assuming the item is also magnetic). Once the magnet 1004 picks the item and moves into an appropriate position, the control unit 302 may communicate a signal to deactivate the battery 1002 (i.e., turn off the current) to release the item.

The item picking device 316 may also be implemented as a claw-device (e.g., as illustrated in FIGS. 4-7). The claw-devices may each be positioned on a spoke portion 112 or other location such that they are able to "grab" items as required. The claw-devices may also be configured with an extension member or the like such as those illustrated in FIG. 9 to be moved in closer proximity to the items when picking.

The claw devices may be configured in a variety of ways. Additionally, the control unit 302 may receive information from memory 308 and instruct the item picking devices 316 accordingly. For example, the amount the claw device must "open" to grab a specific item may be communicated to the control unit 302 which can open the claw device the appropriate amount.

The previously discussed embodiments of the movement mechanism and item picking devices are merely exemplary. Applicant also contemplates that additional embodiments and various modifications of the movement mechanism and item picking devices may be made to accomplish the various features of the invention.

Although several features of the movement mechanism and item picking devices are described as being at least semi-autonomous, they may also be operated manually. For example, if the item picking device 316 is implemented as a claw-device, an operator may control the claw-device via a joystick or the like.

Particular embodiments of the movement mechanism are not required to be used in conjunction with a particular embodiment of the item picking devices. Accordingly, particular embodiments of the item picking device are not required to be used in conjunction with a particular embodiment of the movement mechanism. That is, any type of movement mechanism may be used to move any type of item picking device.

It is also contemplated that the movement mechanism and, namely, the item picking devices may be implemented as modular devices. Assuming all required power and control components are present, the item picking devices may be easily substituted with one another depending on the items to be picked. For example, if the items to be picked are magnetic, the magnetic item picking devices of FIG. 10 may be used. If plastic items need to be picked later, the claw-devices of FIGS. 4-7 may be used in lieu of the magnet devices.

Figure 11:
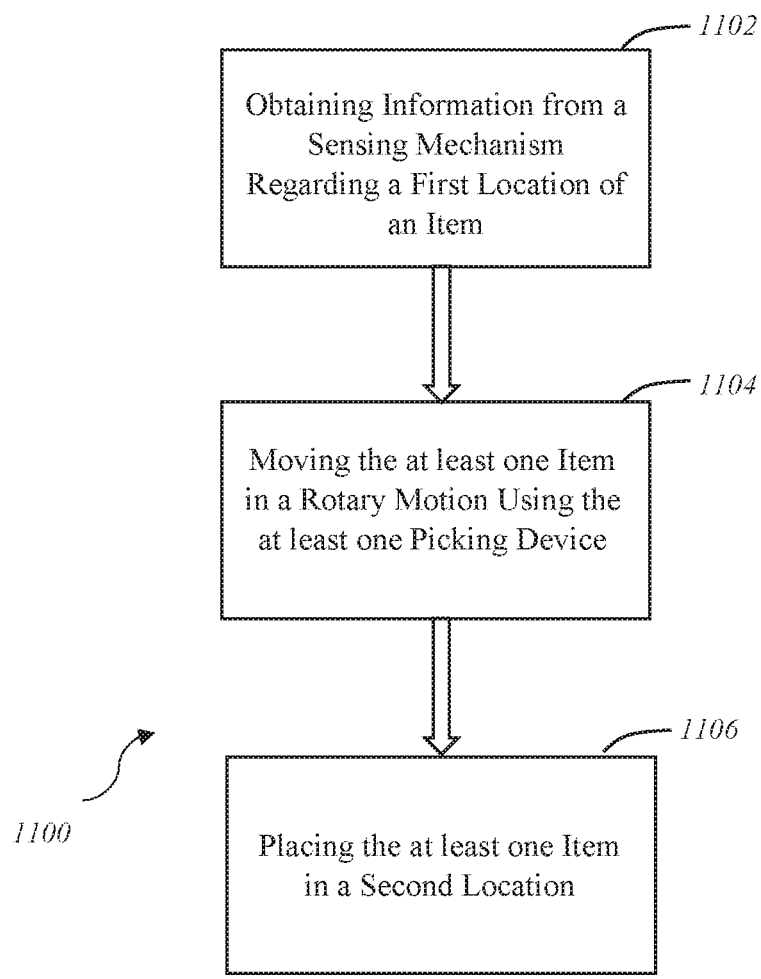
FIG. 11 depicts a flowchart of a method of picking at least one item in accordance with one embodiment of the invention.

FIG. 11 illustrates a flow chart of a method 1100 of picking at least one item. Step 1102 involves obtaining information from a sensing mechanism 310 regarding a first location of an item. The sensing mechanism 310 may be configured in any way mentioned previously, such as camera device(s) and/or weight sensing scales, for example. This information may include where an item is located on a conveyor belt (e.g., in the middle of the conveyor belt, towards the edge of the conveyor belt, etc.).

The speed of the conveyor belt may also be considered so the control unit 302 can calculate when and where would be the most optimal time to pick the item as the item moves along the conveyor belt 102. Similarly, the item's physical configuration can be considered so the item picking device can more easily pick the item. For example, whether the item is upright or on its side as it is moving along the conveyor belt 102 may impact how the item picking device 31 picks the item (e.g., how "wide" a claw-device opens).

Step 1104 involves moving the at least one item in a rotary motion using the at least one picking device 316. The item picking device in accordance with this method may be any type of device described previously, and may be positioned on a rotatable frame member with a center. Once the item picking device 316 picks and is in possession of the item, the rotatable frame member rotates, thereby causing the item picking device to move in a rotary motion.

The rotatable frame member rotates the item picking device until the item picking device is adjacent to the item's destination. Step 1106 involves placing the at least one item in this second location. This second location may be a return belt, for example, which may then move the item to another location for further shipment, processing, or use. Or, the second location may be a bin that is near the conveyor belt, for example.

Figure 12:
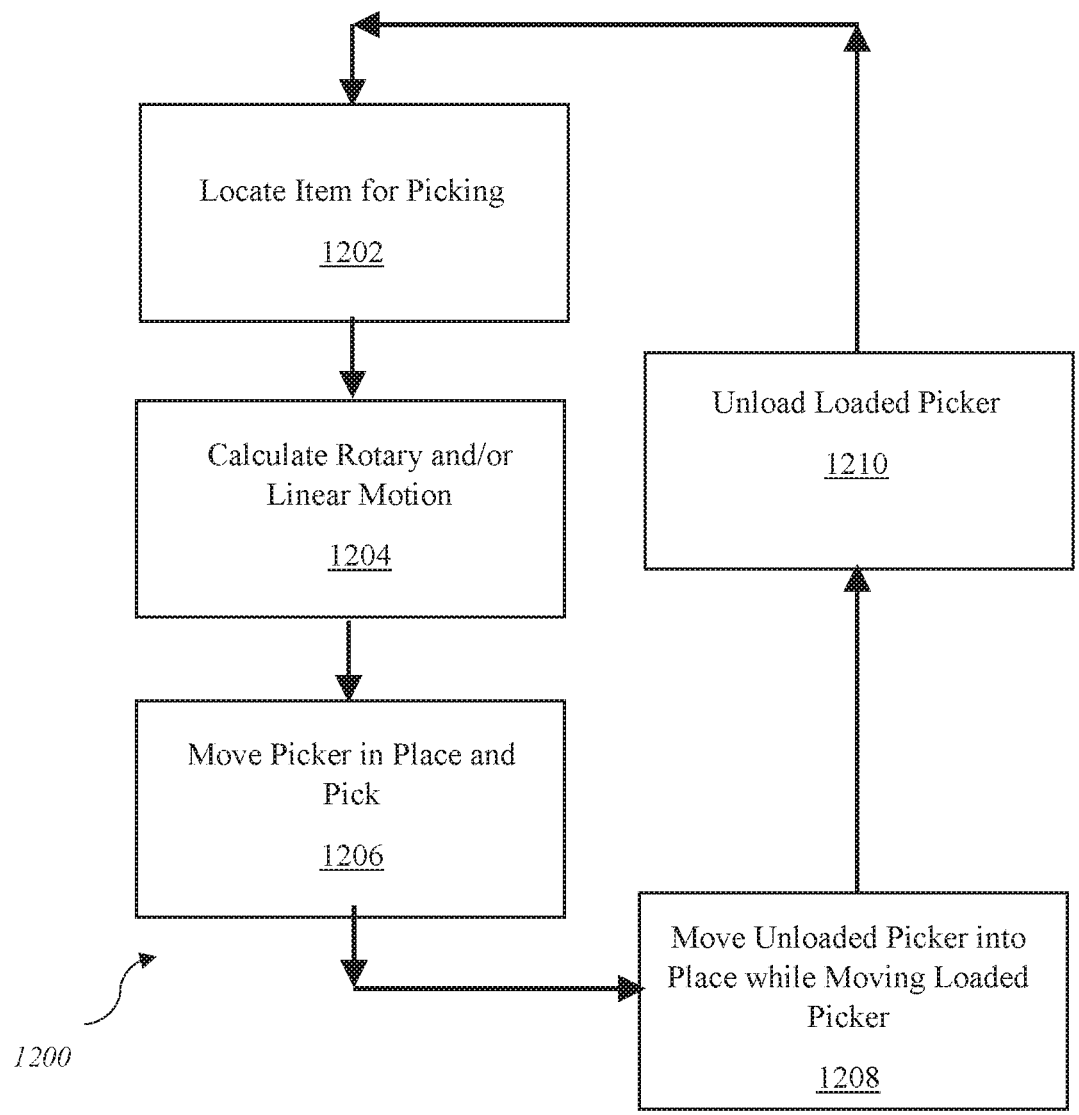
FIG. 12 presents a flowchart of a method of picking at least one item in accordance with another embodiment of the invention.
Figure 13A:
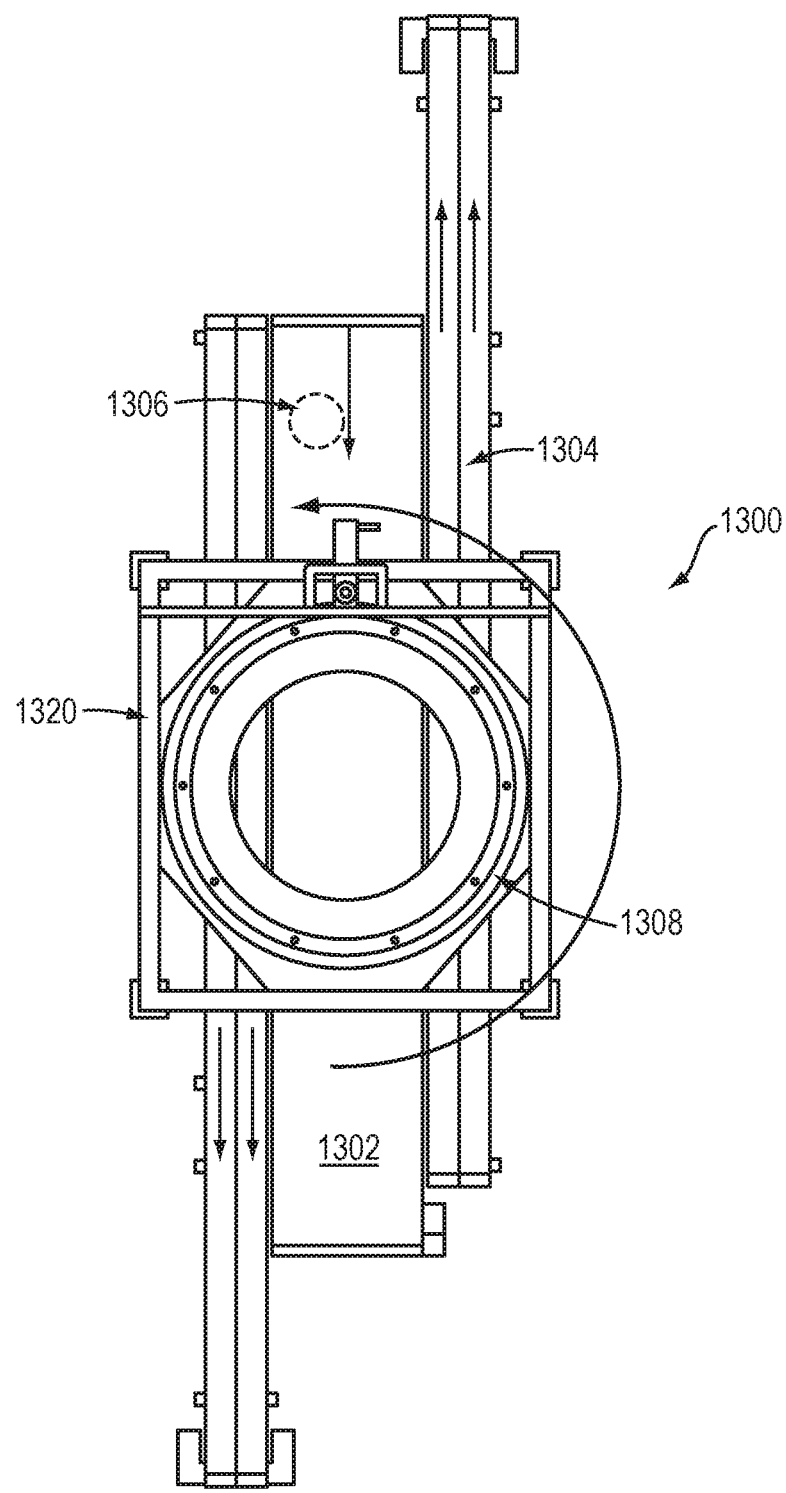
FIG. 13A illustrates an overhead view of a rotary picking apparatus having a rotatable frame and at least one picking device with a multi-axis robotic arm in accordance with one embodiment of the invention.
Figure 13C:
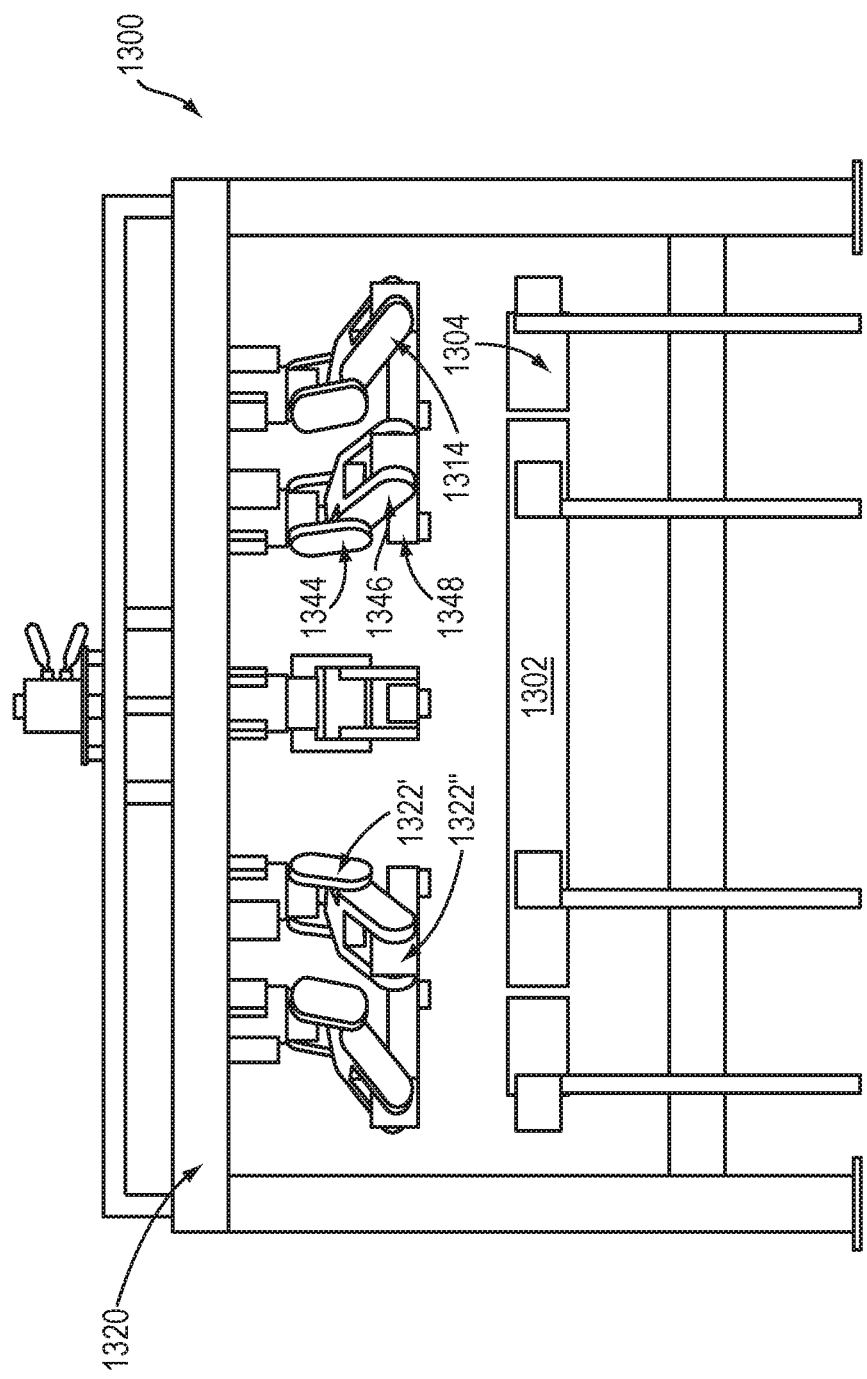
FIG. 13C illustrates a front view of the rotary picking apparatus of FIG. 13A.
Figure 13D:
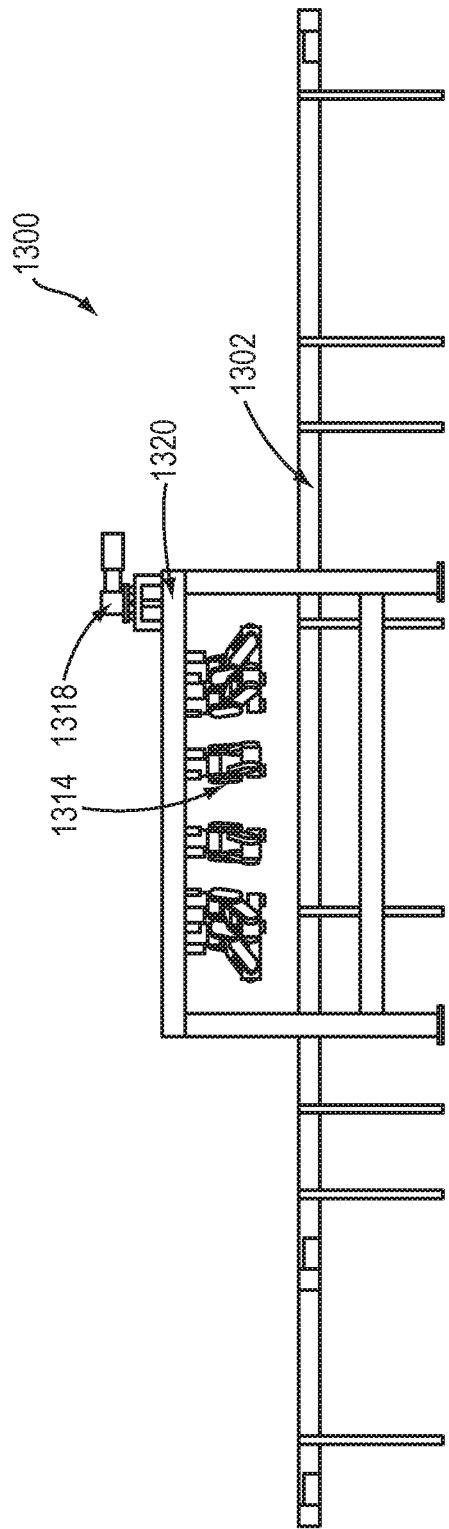
FIG. 13D illustrates a back view of the rotary picking apparatus of FIG. 13A.
Figure 14A:
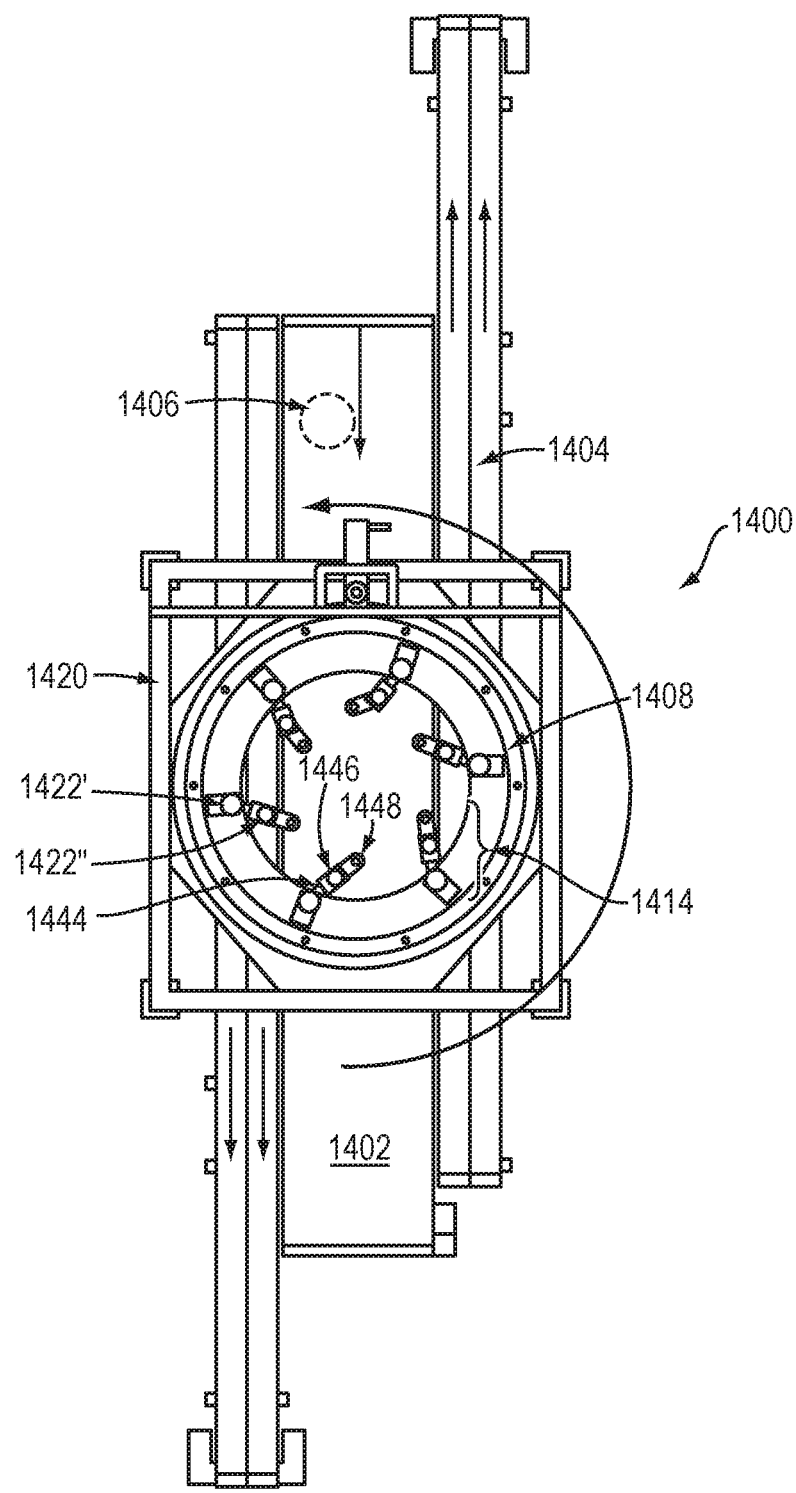
FIG. 14A illustrates an overhead view of a rotary picking apparatus having a rotatable frame and at least one picking device with a multi-axis robotic arm in accordance with one embodiment of the invention.
Figure 14B:
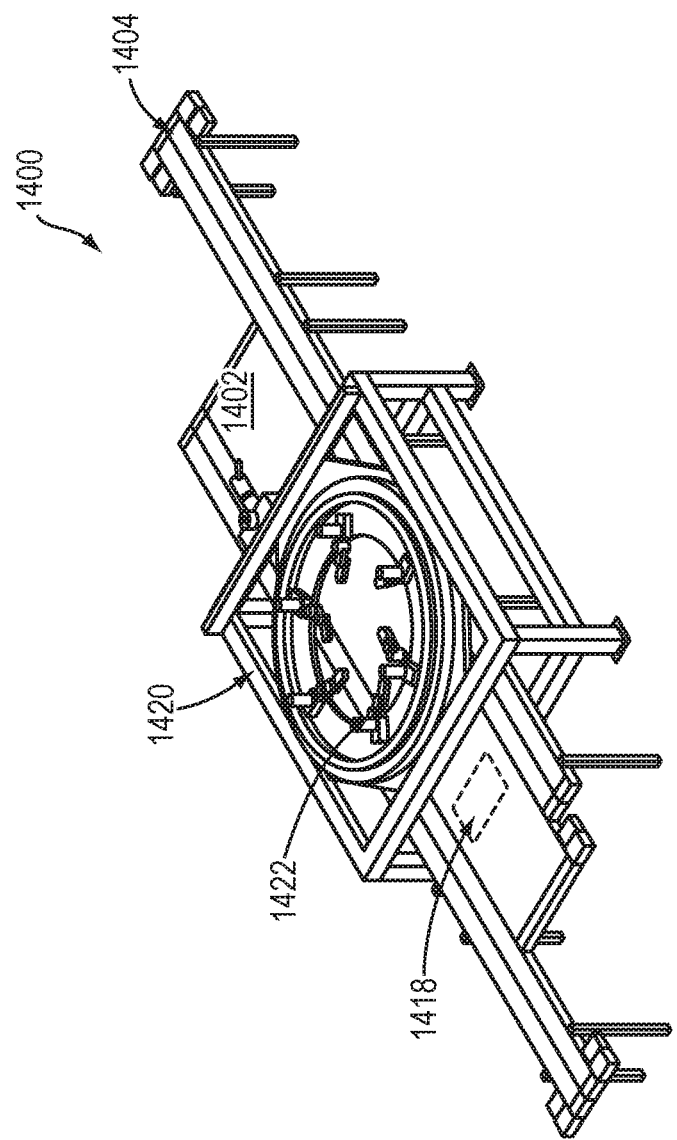
FIG. 14B illustrates a perspective view of the rotary picking apparatus of FIG. 14A.
Figure 14C:
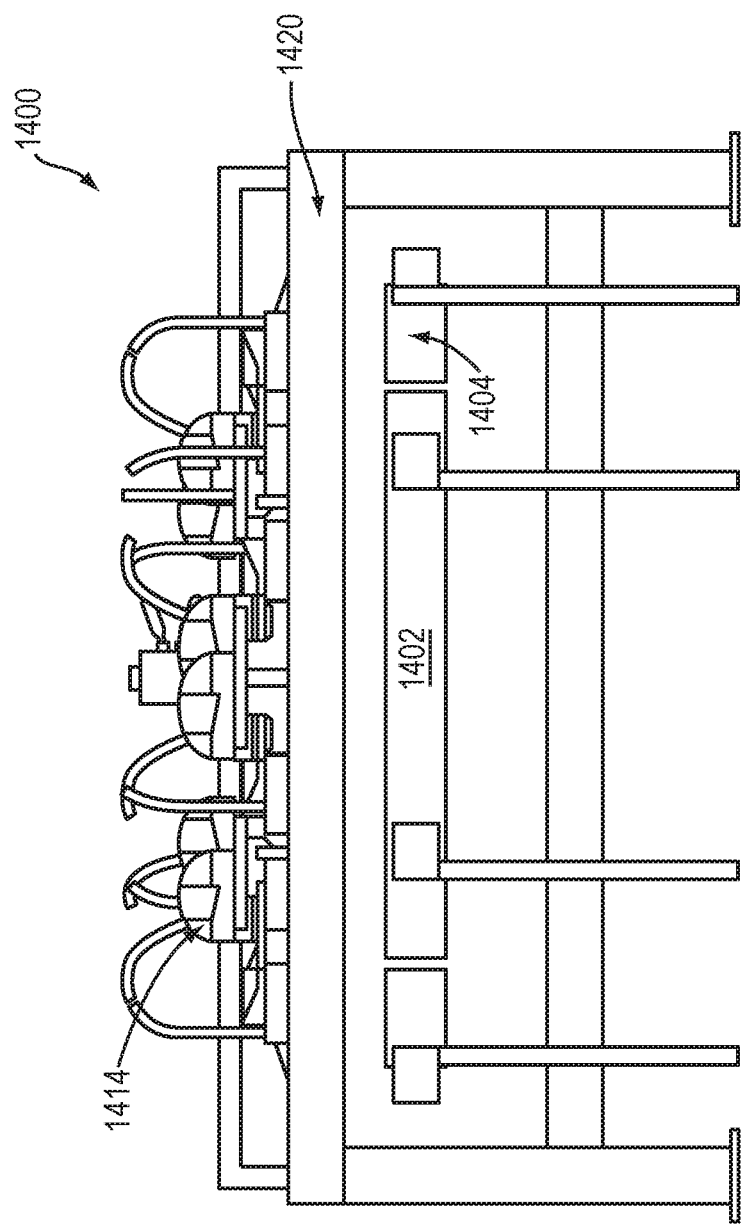
FIG. 14C illustrates a front view of the rotary picking apparatus of FIG. 14A.
Figure 14D:
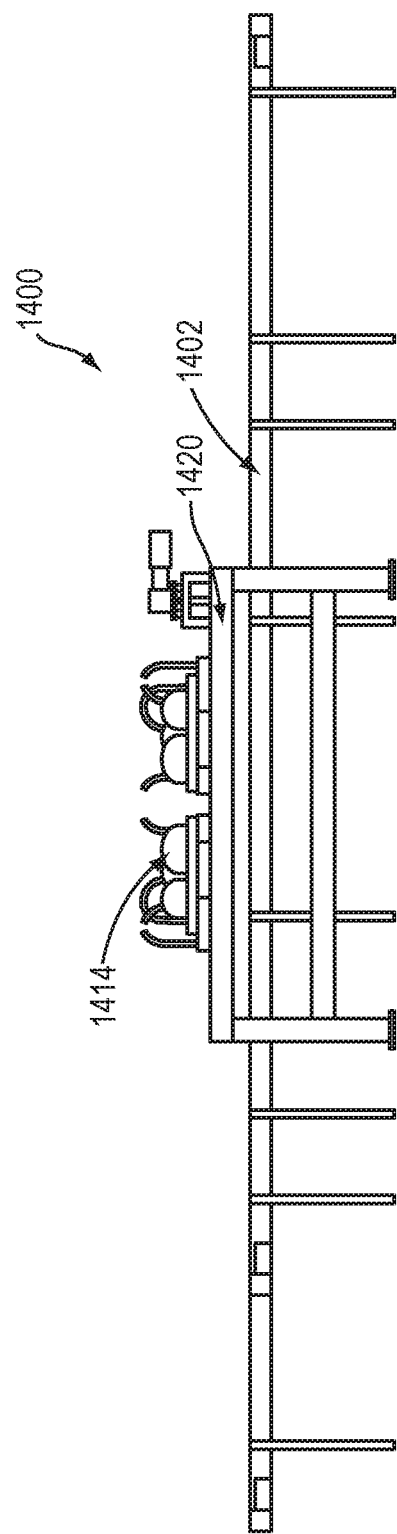
FIG. 14D illustrates a back view of the rotary picking apparatus of FIG. 14A.

FIG. 12 illustrates a flow chart of another method 1200 of picking at least one item. As method 1200 illustrates, the rotary picking apparatus may (but is not required to) pick and place multiple items simultaneously. Step 1202 involves locating an item for picking. This may be done by any of the sensing mechanisms 310 discussed previously, for example.

Step 1204 involves calculating the rotary and/or linear motion required by an item picking device 316 such that the item picking device 316 can pick the item. The control unit 302 may, based on the item's location and speed of the conveyor belt (and therefore the item's future path), calculate how many degrees to rotate the rotatable frame portion (and with what angular velocity) so that the item picking device 316 is able to pick the item.

In some embodiments, the rotary motion may have a constant angular velocity, reducing the computation to a problem of linear actuation. In other embodiments, the rotary motion may be discrete, variable, and reversible to facilitate the pick and place task.

The control unit 302 may also calculate how much to move (in a linear direction) the item picking device 316 (e.g., along a spoke portion). This calculation is also based on at least the speed of the conveyor belt 102 and the item's location on the conveyor belt 102.

Step 1206 involves moving the picker (item picking device 316) in place and picking the item. The item picking device 316 may move into place by moving in a rotary motion (and in a linear motion, if necessary). The item picking device 316 may be configured as in any of the embodiments discussed previously. Once in an appropriate position (i.e., a position in which the item picking device 316 can pick the item from the conveyor belt 102), the item picking device 316 may pick the item.

Step 1208 involves moving the loaded picker towards another location, while also moving at least one other unloaded item picking device 316 to pick another item or items from the conveyor belt 102. This way multiple items can be picked substantially simultaneously. The control unit 302 may determine the required movements for each item picking device 316 so they can gather the maximum amount of items.

Step 1210 involves unloading the item picking device 316. This may be done in any number of ways depending on the type of item picking device 316 used (see FIGS. 7-10, for example). As stated previously, the item may be placed in a second location such as a return conveyor belt, bin, or the like for further shipment, processing, or use.

As can be seen by the arrows in FIG. 12 the method 1200 repeats itself. After an item picking device 316 unloads an item, it may immediately move towards another item for picking. This process may be repeated for all item picking devices 316 so that item picking devices 316 are constantly picking and unloading items.

FIGS. 13A-D illustrate a rotary picker 1300 in accordance with one embodiment of the invention. The rotary picker 1300 is illustrated above a conveyor belt 1302 and return belt(s) 1304 that transport items 1306. The rotary picker 1300 picks items 1306 from the conveyor belt 1302, and then places them in a return belt 1304 which transports to picked items to another location for further processing, storage, or use.

In this embodiment, the rotary picker 1300 includes a rotatable, radial frame portion 1308 with a plurality of picking devices 1314, wherein at least one picking device 1314 has a multi-axis robotic arm.

In this embodiment there are a plurality of item picking devices 1314 and each picking device 1314 is connected to a rotatable frame portion 1308. In some embodiments, the rotary picker 1300 further includes a sensing mechanism 1318 to gather information regarding the items 1306. In some embodiments, the sensing mechanism 1318 may be on the conveyor belt 1302. In some embodiments, the sensing mechanism 1318 may be on the rotatable frame portion 1308. In some embodiments, the sensing mechanism 1318 may be on the outer frame structure 1320. Although ten (10) item picking devices 1314 are illustrated, the number of item picking devices 1314 used may vary and depend on the size of the rotary picker 1300. In this embodiment, the plurality of picking devices 1314 rest below the rotatable frame portion 1308 of the rotary picker 1300. In this embodiment, the outer frame structure 1320 supports the rotatable frame portion 1308.

Although the rotatable frame portion 1308 is illustrated turning in a counter-clockwise formation, the rotatable frame portion 1308 may be configured to turn in a counter-clockwise formation, a clockwise formation, or both a counter-clockwise and clockwise formation.

The rotatable frame portion 1308 may be of any type of configuration as long as it can rotate such that the item picking devices 1314 move in a rotary fashion. In some embodiments, the item picking devices 1314 can collectively pick items 1306 located anywhere on the conveyor belt 1302 under the rotatable frame portion 1308.

The picking device 1314 with a multi-axis robotic arm may have at least one joint 1322 such that each link 1344, 1346, 1348 may move in an independent radial direction. In some embodiments, the at least one picking device 1414 has a first link 1346 and a second link 1348. In some embodiments, links 1346, 1348 may be of equal size. In some embodiments, a first link 1346 may be longer than the second link 1348. In some embodiments, the second link 1348 may be longer than the first link 1346. In some embodiments, the first link 1346 and second link 1348 of the picking device 1314 are connected at a first joint 1322", such that the second link 1348 is configured to move, independently of the first link 1346, at the first joint 1322" between the central axis of rotation and the outer frame structure 1320 to be in a position to pick up at least one item adjacent to the rotatable frame portion 1308. In some embodiments, a first joint 1322" may operate in parallel to a second joint 1322' on a robotic arm.

In some embodiments, the picking device 1314 includes a third link 1344 connected to the first link 1346 at a second joint 1322'. In some embodiments, the third link 1344 is configured to move, independently of the first link 1346 and second link 1348 at the second joint 1322". The movement of the third link 1344 may be restricted to the area between the central axis of rotation and the outer frame structure 1420.

The rotatable frame portion 1308 may be moved (i.e., rotated) by a rotating mechanism. This rotating mechanism may be one or more of a stepper motor, a continuous motor, or a motor that provides a torque force to the frame, etc.

FIGS. 14A-D illustrate a rotary picker 1400 in accordance with one embodiment of the invention. The rotary picker 1400 is illustrated above a conveyor belt 1402 and return belt(s) 1404 that transport items 1406. The rotary picker 1400 picks items 1406 from the conveyor belt 1402, and then places them in a return belt 1404 which transports to picked items to another location for further processing, storage, or use.

In this embodiment, the rotary picker 1400 includes a rotatable, radial frame portion 1408 with a plurality of picking devices 1414, wherein at least one picking device 1414 has a multi-axis robotic arm. In this embodiment there are a plurality of item picking devices 1414 and each picking device 1414 is connected to at least one rotatable frame portion 1408. In some embodiments, the rotary picker 1400 further includes a sensing mechanism 1418 to gather information regarding the items 1406. Although six (6) item picking devices 1414 are illustrated, the number of item picking devices 1414 used may vary and depend on the size of the rotary picker 1400. In this embodiment, the plurality of picking devices 1414 rest above the rotatable frame portion 1408 of the rotary picker 1400. In this embodiment, an outer frame structure 1420 supports the rotatable frame portion 1408.

The picking device 1414 with a multi-axis robotic arm may have at least one joint 1422 such that each link 1444, 1446, 1448 may move in an independent radial direction. In some embodiments, the at least one picking device 1414 has a first link 1446 and a second link 1448. In some embodiments, links 1446, 1448 may be of equal size. In some embodiments, a first link 1446 may be longer than the second link 1448. In some embodiments, the second link 1448 may be longer than the first link 1446. In some embodiments, the first link 1446 and second link 1448 of the picking device 1414 are connected at a first joint 1422", such that the second link 1348 is configured to move, independently of the first link 1446, at the first joint 1422" between the central axis of rotation and the outer frame structure 1420 to be in a position to pick up at least one item adjacent to the rotatable frame portion 1408. In some embodiments, a first joint 1422" may operate in parallel to a second joint 1422' on a robotic arm.

In some embodiments, the picking device 1414 includes a third link 1444 connected to the first link 1446 at a second joint 1422'. In some embodiments, the third link 1444 is configured to move, independently of the first link 1446 and second link 1448 at the second joint 1422". The movement of the third link 1444 may be restricted to the area between the central axis of rotation and the outer frame structure 1420.

In some embodiments, each picking device 1414 has six degrees of freedom.

Although the rotatable frame portion 1408 is illustrated turning in a counter-clockwise formation, the rotatable frame portion 1408 may be configured to turn in either a counter-clockwise formation, a clockwise formation, or both a counter-clockwise and clockwise formation.

The rotatable frame portion 1408 may be of any type of configuration as long as it can rotate such that the item picking devices 1414 move in a rotary fashion. The rotatable frame portion 1408 may be moved (i.e., rotated) by a rotating mechanism. This rotating mechanism may be one or more of a stepper motor, a continuous motor, or a motor that provides a torque force to the frame, etc. The picking device 1414 with a multi-axis robotic arm may have at least one joint 1422 such that each piece of the robotic arm can move in an independent radial direction.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

For example, in one alternate embodiment, a rotary picker may have one or more robot pickers mounted on a frame. The pickers may face outward from the center of the frame, inward toward the center of the frame, or both.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

What is claimed is:

1. An item picking apparatus, the apparatus comprising:
   a rotatable frame portion having a central axis of rotation and an exterior rim; and
   a plurality of picking devices that are each operably connected to the rotatable frame portion, wherein:
      at least one picking device is a multi-axis robotic arm, the multi-axis robotic arm having a first link and a second link;
      the exterior rim defines a boundary around the central axis of rotation, wherein the boundary extends in a direction parallel to the central axis of rotation;
      the first link and second link of the multi-axis robotic arm are connected at a first joint, such that the second link is configured to move, independently of the first link and within the boundary defined by the exterior rim, around the first joint between the central axis of rotation and the exterior rim to be in a position to pick up at least one item adjacent to the rotatable frame portion and within the boundary of the exterior rim.

2. The apparatus of claim 1, wherein the multi-axis robotic arm has six degrees of freedom and the rotatable frame portion is configured to rotate about the central axis of rotation, such that the multi-axis robotic arm is in a position to pick up the at least one item.

3. The apparatus of claim 1, wherein the multi-axis robotic arm further comprises a third link connected to the first link of the multi-axis robotic arm at a second joint.

4. The apparatus of claim 1, wherein the multi-axis robotic arm is configured to:
   extend in a direction parallel to the central axis of rotation of the rotatable frame portion to pick the at least one item; and
   move in a direction perpendicular to the central axis of rotation of the rotatable frame portion within the boundary to be in a position to pick the at least one item.

5. The apparatus of claim 1, wherein the first link of the multi-axis robotic arm is coupled to the rotatable frame portion.

6. The apparatus of claim 1, wherein the picking devices are implemented as one or more of a vacuum device, a magnetic device, a claw device, a manual gripping device, or a suction device.

7. The apparatus of claim 1, furthering comprising at least one sensing mechanism to gather information regarding the location of the at least one item to be picked.

8. The apparatus of claim 1, wherein a vacuum device, a magnetic device, a claw device, a manual gripping device, or a suction device is coupled to the second link.

9. The apparatus of claim 1, wherein the rotatable frame portion, having a circular face, is operably positioned with respect to a conveyor belt to enable the picking devices to pick the at least one item from the conveyor belt, such that a first planar surface containing the conveyor belt and the at least one item when picked from the conveyor belt is substantially parallel to a second planar surface containing the circular face of the rotatable frame portion.

10. The apparatus of claim 1, further comprising a rotating mechanism capable of rotating the rotatable frame portion clockwise and counter-clockwise around the central axis of rotation, wherein the rotating mechanism is one or more of a continuous motor, a stepper motor, or a motor that applies a torque force to the rotatable frame portion.

11. The apparatus of claim 1, further comprising a control unit configured to receive imagery related to the at least one item to be picked, process the image information using computer vision analysis, determine the at least one item to be picked from all items located adjacent to the rotatable frame portion, and further configured to control movement of the picking devices so that the picking devices can pick the at least one item.

12. The apparatus of claim 1, further comprising a control unit, wherein the control unit is configured to control the movement of the plurality of picking devices so that the plurality of picking devices can pick at least one item selected to be picked and pass over other items from a plurality of items detected using computer vision analysis.

13. A method of picking at least one item, the method comprising:
   obtaining information from a sensing mechanism regarding a first location of the item;
   picking the item using an item picking apparatus comprising at least one picking device, wherein:
      the at least one picking device is operably connected to a rotatable frame portion with a central axis of rotation and an exterior rim;
      the at least one picking device is a multi-axis robotic arm, the multi-axis robotic arm having a first link and a second link;
      exterior rim defines a boundary parallel to the central axis of rotation;
      the first link and the second link of the multi-axis robotic arm are connected at a first joint, such that the second link is configured to move, independently of the first link and within the boundary defined by the exterior rim, around the first joint between the central axis of rotation and the exterior rim to be in a position to pick up at least one item adjacent to the rotatable frame portion and within the boundary of the exterior rim; and
   placing the at least one item, using the picking device, in a second location.

14. The method of claim 13, wherein the multi-axis robotic arm has six degrees of freedom and the rotatable frame portion is configured to rotate about the central axis of rotation, such that the multi-axis robotic arm is in a position to pick up the at least one item.

15. The method of claim 13, wherein the first location is a conveyor belt.

16. The method of claim 13, wherein the second location is a return belt.

17. The method of claim 13, wherein the at least one picking device is implemented as one or more of a vacuum device, a magnetic device, a claw device, a manual gripping device, or a suction device.

18. The method of claim 13, wherein motion of the picking device is provided by one or more of a continuous motor, a stepper motor, or a motor that applies a torque force to the rotatable frame portion.

19. The method of claim 13, wherein the multi-axis robotic arm is configured to:
- extend in a direction parallel to the central axis of rotation of the rotatable frame portion to pick the at least one item; and
- move in a direction perpendicular to the central axis of rotation of the rotatable frame portion within the boundary to be in a position to pick the at least one item.

20. The method of claim 13, wherein the item picking apparatus comprises a plurality of picking devices, wherein the plurality of picking devices are multi-axis robotic arms.

* * * * *